United States Patent

Nilsson et al.

[11] Patent Number: 5,906,931
[45] Date of Patent: May 25, 1999

[54] METHOD AND DEVICE FOR DIGESTION OF SLUDGE

[75] Inventors: Peter Nilsson, Brösarp; Eskil Olsson, Stockholm, both of Sweden

[73] Assignee: Eskil Olsson, Stockholm, Sweden

[21] Appl. No.: 09/011,385

[22] PCT Filed: Aug. 2, 1996

[86] PCT No.: PCT/SE96/00983

§ 371 Date: Feb. 10, 1998

§ 102(e) Date: Feb. 10, 1998

[87] PCT Pub. No.: WO97/06110

PCT Pub. Date: Feb. 20, 1997

[30] Foreign Application Priority Data

Aug. 10, 1995 [SE] Sweden ................................. 9502798

[51] Int. Cl.[6] .............................. C12S 13/00; C12M 1/02
[52] U.S. Cl. ................... 435/262; 435/286.7; 435/290.2; 435/294.1; 435/300.1; 435/819; 210/613
[58] Field of Search ..................... 435/262, 267, 435/277, 286.1, 286.7, 290.2, 290.4, 294.1, 298.1, 300.1, 819; 71/10, 9, 8; 210/603, 609, 613, 623, 179, 195.1; 366/209–212

[56] References Cited

U.S. PATENT DOCUMENTS

| 941,634 | 11/1909 | Godley . |
| 2,458,431 | 1/1949 | Schlenz . |
| 4,388,186 | 6/1983 | Fujimoto et al. . |

FOREIGN PATENT DOCUMENTS

| 3230010 | 3/1984 | Germany . |
| 3341027A1 | 5/1985 | Germany . |
| 1131899 | 12/1984 | U.S.S.R. ............................. 435/294.1 |
| 2144767 | 8/1984 | United Kingdom . |
| 80/01286 | 6/1980 | WIPO . |

*Primary Examiner*—William H. Beisner
*Attorney, Agent, or Firm*—Mathews, Collins, Shepherd & Gould, P.A.

[57] ABSTRACT

Method and device for digestion of sludge, sludge being transferred stepwise to closed containers (10A, 10B) and gas generated during the digestion process being transferred from said containers (10A, 10B). The sludge is transferred to a first closed space (11A) in a first container (10A) for a first digestion period, and is then after a predetermined period transferred to a second closed space (11B) in a second container (10B) for a second digestion period. During said first digestion period as well as during said second digestion period the sludge is repeatedly put into movement by tipping said containers (10A, 10B), the flow direction of said sludge being changed to redirect surface material of the sludge to bottom material by the movement of the sludge. Each of said containers (10A, 10B) is provided with an inlet (12) for sludge and a first outlet (13) for gas generated during the digestion period. Said first closed space (11A) and said second closed space (11B) are connected to each other through a valve (16), and internally they are provided with flow redirectors (22) so as to improve the homogenisation of the Said containers (10A, 10B) are designed to be tipped between two positions.

19 Claims, 3 Drawing Sheets

METHOD AND DEVICE FOR DIGESTION OF SLUDGE

TECHNICAL FIELD

The invention relates to a method and a device for digestion of sludge according to claim 1.

BACKGROUND ART

In many countries there is a short supply of water and it is costly to construct sewers of an appropriate slope to use water as a transporting medium. By choosing to have an early separation the transport is facilitated and the need of water is reduced. A lower amount of water will also facilitate an efficient treatment of sludge. By constructing a separating device as close as possible to the origin of the waste water the problems discussed above can be reduced and the quality of the sludge improved.

Such an early separation is described in SE 9000921 according to which a sewer system having a plurality of separating tanks is used.

To use digestion of sludge for reducing biological material and odor in the treatment of sludge is well known from a plurality of patent documents. Such use is described e.g. in SE 7801404 and SE 7909320.

Also DE-A1-3 230 010 disclosed a device for digestion of sludge. A tank divided into four chambers is used for the digestion. The tank can be tipped between two positions. The digestion process takes part in a bottom layer and some sludge will float up to the surface where it is digested only slowly or not digested at all. Biogas which is formed during the process presses liquid from one chamber into the second, and the tank is tipped from slightly tipping in one direction to slightly tipping in another direction. Valves within the tank are used for the passage of gas in an appropriate way. According to the patent document the steering of sludge should be slow and without turbulence, and a plurality of rotatable flaps and similar devices are used. The reliability in operation of the system described in DE-A1-3 230 010 tends to be low as a result of using movable parts and valves within the tank.

Problems that are not considered completely presently when devices for the digestion of sludge are used are e.g. odor and extended required digestion periods resulting in high demands on large sludge drying beds and on a high quality of the sludge and also to the concentration to large plants.

An object of the present invention is to essentially solve the problems discussed above such as large volumes, odor, low quality of sludge and specially made material. Another object is to accomplish a reliable device.

The object has been obtained by including in the invention the features of claim 1.

SUMMARY OF THE INVENTION

The invention relates to a device for digestion of sludge in sewing systems comprising a dewatering chamber, a separate predigestor connected to a separate post digestor through a connecting line having an automatically controlled valve, said post digestor in turn being connected to a sludge receiver which is fed by sludge as well as mulch. The digested sludge material is automatically laid out in heaps for a maturing stage and can be mixed with garden waste to form a final product to be reused as a fertiliser. The process is anaerobic and gas is formed, which can be used for the heating of the sludge to increase the digestion efficiency and to decrease the digestion period. The sewing water comprises inter alia in solution the fertiiising compounds phosphorous and nitrogen and sometimes also added grinded sludge material from kitchen mills. Garden waste can also be added to the sludge to increase the amount of gas. Particles and sludge are separated at an early stage close to the source in a special separator and are transported by a pressure or vacuum system in thin tubes to a sludge treatment plant without generating any odor as a sanitary nuisance.

In the treatment plant the separated sludge first enters a second closed dewatering chamber, an inlet thereof being provided at a high position to accomplish a sedimentation and further thickening of the sludge. Excess water is led to a filtration tank to be treated. The thickened sludge is led automatically without any supply of air to a first separate digestor which suitably is circular and has a volume which is adapted to the expected load. Inside said digestor is provided with a device which facilitates homogenisation of the sludge during fast tipping movements of the digestor. The tipping takes place within certain time intervals and at an appropriate speed. The control of the tipping movement can be automatized. The digestor is externally provided with a heating device connected to a digestor gas combustion/biogas plant. A temperature increase of the sludge will accelerate the digestion and accordingly decreases the duration of stay within the digesters.

When a selected time period has expired the sludge is transferred automatically from a step one digestor to a step two digestor for a corresponding digestion period. Both digesters are similar and form together a module unit for digestion. If there are larger amounts of sludge further modules can be connected in parallel to form a closed plant.

The anaerobic microbial population is larger in the step two digestor, because this digestor is not exposed to oxygen containing water.

It could therefore be appropriate to retransfer some part of the sludge of the step two digestor to the step one chamber before refilling the step one digestor so as to increase the speed of degradation and the production of gas. Such a retransfer can take place through a further container. Instead it would be possible to transfer only a part of the sludge from the step one digestor to the step two digestor.

The digestion time in one module is approximately 14 days, whereafter the sludge can be discharged into a screw milling the sludge together with mulch to a thick consistency adapted to be put out automatically in heaps on a sludge drying bed. After maturing of the sludge the material is suitable to be spread out on the fields or the soil.

BRIEF DESCRIPTION OF DRAWINGS

The invention will now be described by means of practical embodiments, reference being made to the accompanying drawings, in which.

DESCRIPTION

Figure 1:
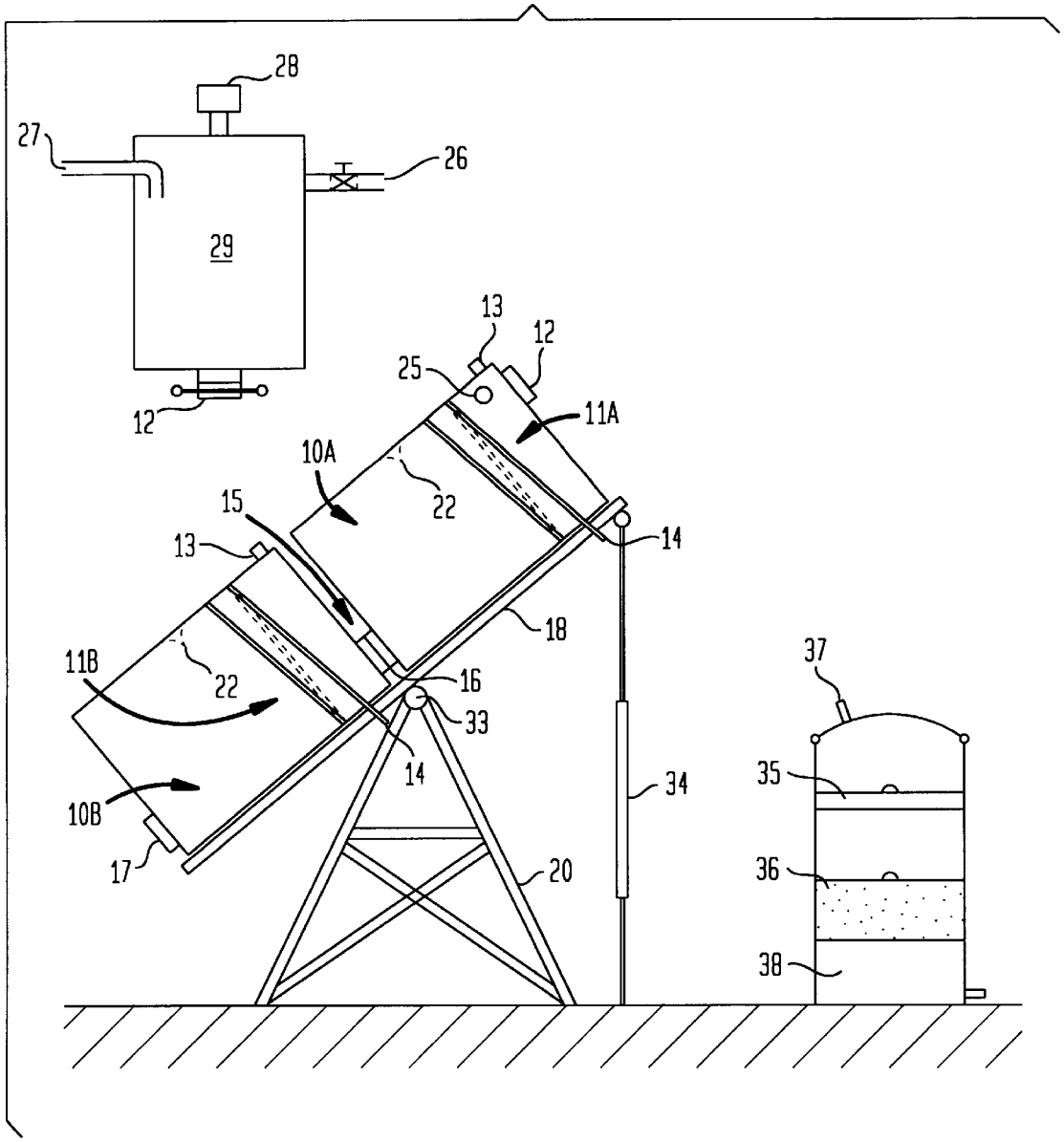
FIG. 1 shows a device according to the invention.

FIG. 1 shows that the device according to the invention comprises a closed free-standing dewatering chamber 29 and two separate digestors or containers 10A and 108 in series. Said dewatering chamber 29 is provided 10 with an inlet 27, a valve28 and an outlet valve26 having an outlet. Through a coupling 12 said dewatering chamber is connected to said digestor 10A. The function of a presedimentation chamber is to pre-treat the sludge to obtain an appropriate water content. If the sludge is not thickened enough the digestion will be less efficient. An appropriate concentration is at least 4–5 percent dry matter of the sludge entering the digestors.

In each of the digesters 10A and 10B a liquid space 11A and 11B, respectively, is enclosed. Said digesters 10A and 10B are mounted on a cradle 18, resting on a support 20 having a centered arrangement 33 which allow a varying slope against the horizontal plane. The fast tipping movements of the cradle is in the shown embodiment accomplished by a lifting device 34. The fast tipping movement makes the liquid within the digesters move heavily which results in good homogenisation of the sludge. In a preferred embodiment said digesters 10A and 10B are circular cylindrical.

Said digestor 10A is provided with a coupling 12 and an outlet 15 having an automatic valve 16 through which the sludge is passed on to the chamber 10B in step two for a second period of digestion. Said chambers 10A and 10B are internally provided with flow redirectors 22 facilitating a homogenisation of the sludge during the fast tipping movements. Said flow redirectors 22 are provided within said chambers 10A and 10B radially projecting from a wall. In a simple and preferred embodiment said flow redirectors 22 comprise discs arranged centrally-in axial direction in the chambers and radially projecting approximately one third of the diameter of the chambers from that side of the chambers forming the upper side when the chambers are in a horzontal position. As a result of this arrangement and design there will be strong redirection of the direction of the flow and following from that a homogenisation of the sludge during the fast tipping movements of the chambers. Preferably said flow directors 22 are arranged to accomplish a similar redirection function in both directions of tippings. Therefore, said flow directors 22 are provided approximately in a central position in the axial direction of both chambers 10A and 10B.

Externally both chambers are provided with heating devices 14. In a preferred embodiment a heating device 14 is connected to a biogas combustion unit or a heating element 23. During the digestion digestor gas is generated, and the digestor gas is taken care of according to the shown embodiment through a connecting line 13 on top of the tank. The gas line opens in a gas-holder 24.

When a suitable volume of sludge provided through said inlet 12 has been reached in chamber 10A a valve is closed in the inlet 12. After a few days the excess liquid which has been formed in the chamber 11 is transferred by means of gravity discharge to a liquid container 38 provided with a valve/connector 37, said container 38 being provided with a prefilter 35 made of turf and a postfilter 36 made of turf for the reduction of phosphorous and nitrogen and smaller solid particles accompanying the liquid. After passage of said turf filters the liquid is passed on to infiltration or to a normal sewage treatment plant.

The thickened sludge is now digested during a first period of time in said chamber 10A. During that time there is also provided a homogenisation of the sludge through fast tipping movements by some time intervals during which said flow redirectors 22 in the chamber will create wave motions that will result in a homogenisation of the sludge. The gas generated in the chamber 10A is led automatically through a connection pipe to said gas-holder 24 where the gas is partly purified by passing through a liquid bath while the purified gas is led to said heating device 23. Heated water is produced in said heating device 23 and is used to increase the temperature in the chamber 10A to approximately 35° C. to accelerate the digestion process. After a digestion period adapted to the supply of sludge through said inlet 12 and in said digestor 10A a lock in the outlet 15 and said valve 16 is opened and the sludge in the stage one chamber 10A is automatically transferred to step two chamber 10B in which the same process will take place as in 10A. The digestion in the chambers 10A, 10B is at least five days. Preferably the digestion period is at least seven days. During this time period the tipping movements are repeated at suitable intervals, preferably with a few hours repetition time. Sludge can be filled alternatively in module units 1 and 2.

Figure 2:
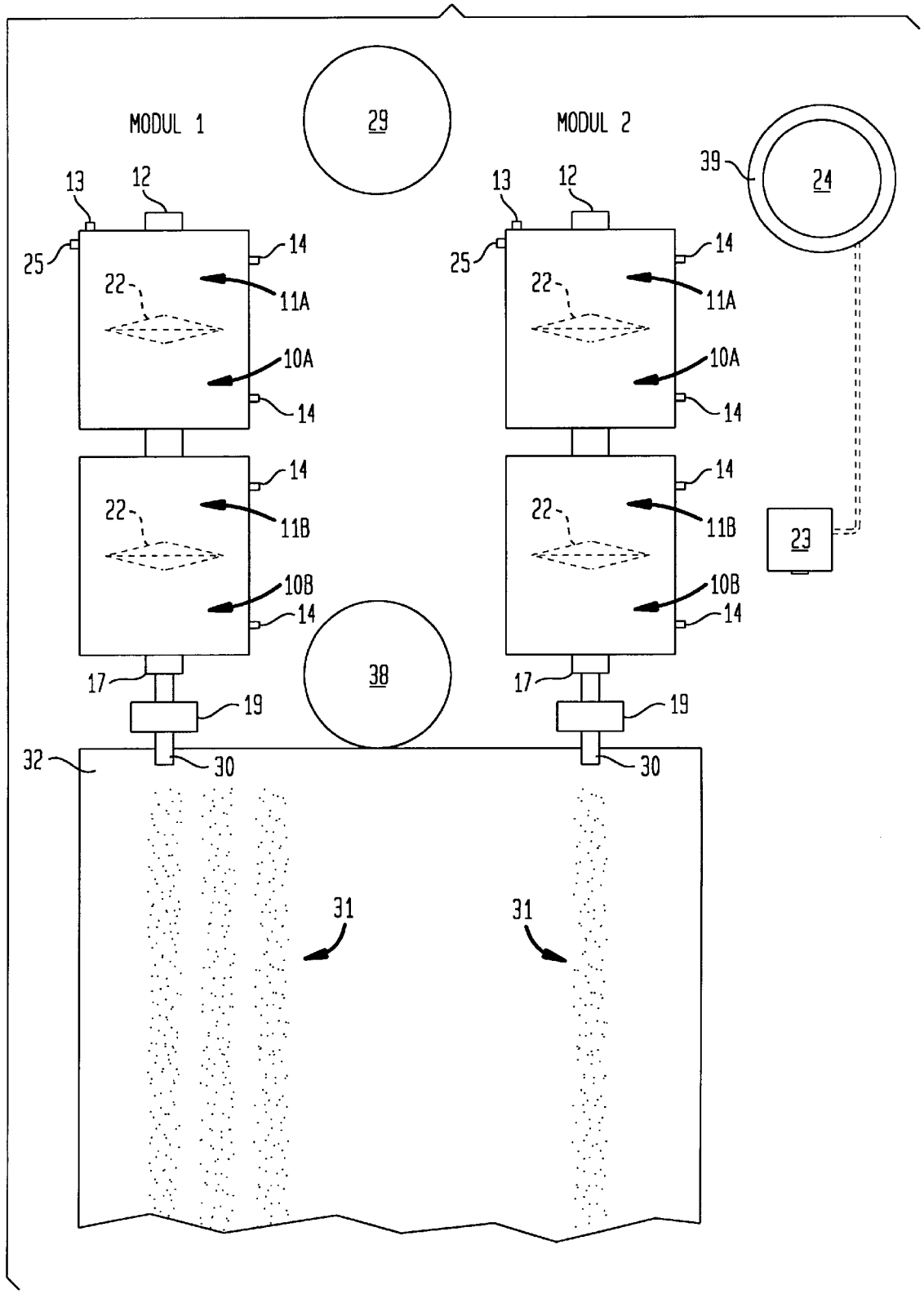
FIG. 2 is a basic drawing showing a device according to the invention for use within one field of application.

FIG. 2 shows what happens after the second digestion procedure in chamber 10B. The sludge is transferred through an outlet valve 17 to a screw device 30 where the digested sludge is mixed with mulch in a feeding device 19 and with inter alia garden waste in a second feeding unit and then put out in heaps 31 in a bed 32 arranged for this purpose. Then there is a maturing stage before the compost material is collected for manuring or to be put into bags.

Figure 3:
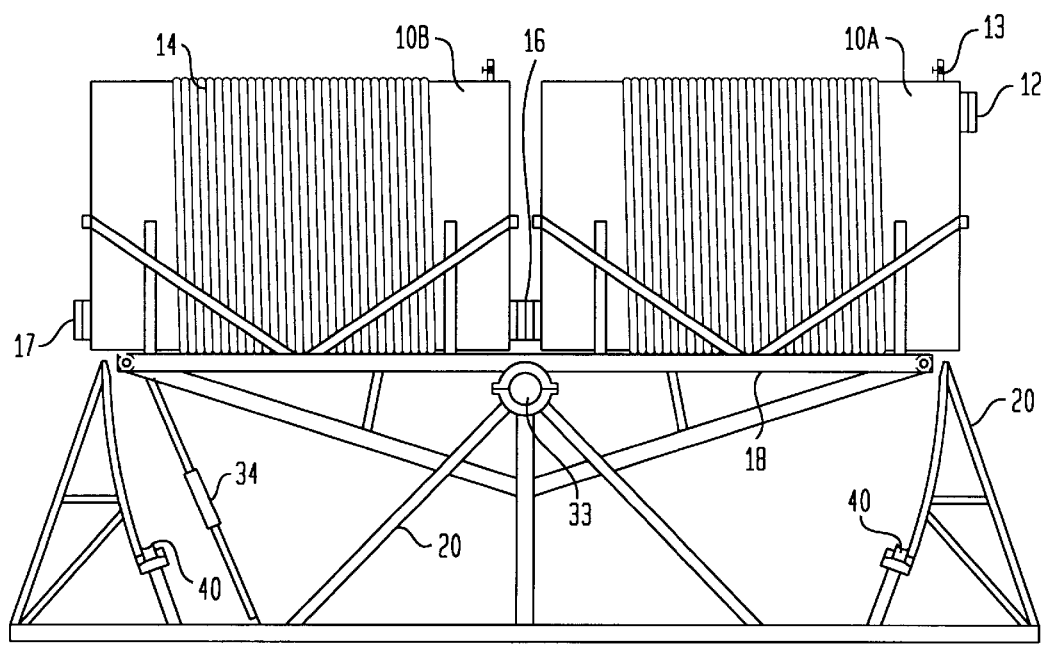
FIG. 3 shows an alternative embodiment of a device according to the invention.

FIG. 3 shows an alternative embodiment of one of the main components of the invention. In contrast to the embodiment according to FIG. 1 the cradle 18 with the containers 10A and 10B is pivotable within a more limited angle area limited by stops 40. Said stops are provided on the support 20. The inclination of the containers 10A and 10B allowed in this embodiment is sufficient to steer the sludge as desired and also to have a gravitational flow from the container 10A to the container 10B when the valve 16 is opened.

Figure 4:
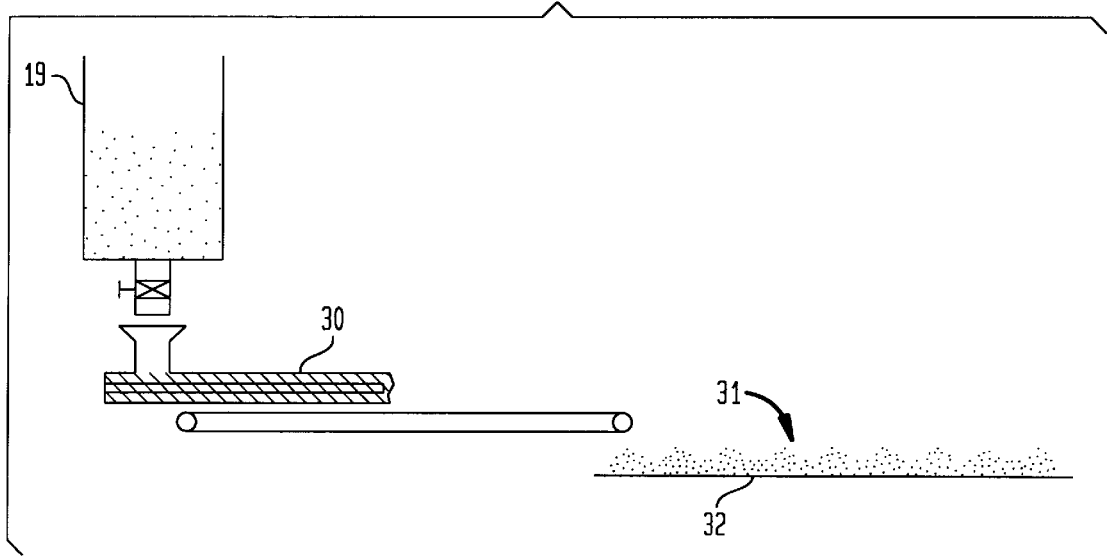
FIG. 4 is a side elevational view of a part of the device according to FIG. 2.

FIG. 4 shows in an elevational view how biological material, such as mulch or garden waste from a feeding device 19, is mixed with digested sludge. The mixture is then transferred through a screw device 30 to heaps 31 in a bed 32.

The highly compact embodiment of the device according to the invention will considerably facilitate within the area of application described above, but also within other areas where a module extension is possible and an adaptation can be made to incoming volumes of sludge in relation to the chamber 10A, viz. to the population data. The almost odour-free method of digestion will allow a location of the plant close to built-up areas, however, under a roof.

We claim:

1. A method for digestion of sludge, according to which sludge is transferred to a closed container and gas generated during the digestion process is transferred from said container, said method comprising the steps of:

transferring the sludge to a first closed space within said container for a first period of digestion, transferring said sludge after a predetermined time period to a second closed space in a second container for a second period of digestion, forcing the sludge to move back and forth while redirecting the flow of the sludge during said first period of digestion as well as during said second period of digestion by repeatedly tipping said container back and forth by means of a lifting device operatively connected to said containers, and redirecting wave motions generated by said tipping back and forth by flow redirectors arranged within said containers, thereby providing a good homogenization of the sludge.

2. A method according to claim 1 wherein the transfer of sludge between said containers is made without a supply of air.

3. A method according to claim 1 wherein the transfer of sludge between said containers is made by a gravitational flow.

4. A method according to claim 1 wherein said first period of digestion is equally long as said second period of digestion.

5. A method according to claim 1 wherein said first period of digestion is at least five days.

6. A method according to claim 1 wherein said first period of digestion is at least seven days.

7. A method according to claim 1 further comprising the step of heating the sludge in at least one of said containers so as to accelerate the process of digestion.

8. A method according to claim 1 further comprising the step of heating the sludge with gas generated by the digestion.

9. A method according to claim 1, further comprising the step of mixing digested sludge with biological material in a maturing stage.

10. A device for digestion of sludge, said device comprising:
   a first container defining a first closed space for receiving the sludge for a first digestion period,
   a second container defining a second closed space for receiving the sludge for a second period of digestion, each of said and second containers having an inlet for sludge and a first outlet for gas generated during said digestion periods,
   said first closed space and second closed space connected to each other through a valve,
   the outside of said containers connected to a mechanical lifting device so as to be forced to tip back and forth between two separate end positions,
   said first container and said second container internally provided with flow redirectors, so as to redirect the flow direction of the sludge and to improve a homogenization of the sludge, and said valve provided in a connection between said first container and said second container, said valve opening after a predetermined period of digestion when said first closed space is disposed at a higher level than said second closed space.

11. A device according to claim 10, wherein at least one of said containers is provided with a heating device for heating the sludge in said container.

12. A device according to claim 11 further comprising heating means connected to said heating device, wherein said outlet for gas of at least one of said containers is connected to said heating means for a transfer of digestor gas.

13. A device according to claim 10, wherein said valve provides a transfer of sludge from said first space to said second space through a gravitational flow without supply of air.

14. A device according to claims 10, wherein said containers are mounted on a tipping support.

15. A device according to claim 14, wherein said tipping support provides tipping of said containers from a horizontal position to positions of at least +30° from said horizontal position and then back again.

16. A device according to claim 10, wherein said flow redirectors comprise a flat disc projecting from an internal wall of said containers for steering of the sludge during the tipping movement.

17. A device according to claim 10, wherein said flow redirectors comprise a disc having a taper wave shape in cross-section projecting from an internal wall of said containers.

18. A device according to claim 10, wherein said containers are circular cylindrical.

19. A device according to claim 10, further comprising a dewatering chamber for thickening of the sludge to a suitable concentration of dry matter, said dewatering chamber is connectable to said first container for a transfer of thickened sludge.

* * * * *